(12) United States Patent
Hirasawa et al.

(10) Patent No.: US 6,328,007 B1
(45) Date of Patent: Dec. 11, 2001

(54) INTERNAL CYLINDER INTAKE-AIR QUANTITY CALCULATING APPARATUS AND METHOD FOR VARIABLE VALVE OPEN/CLOSURE TIMING CONTROLLED ENGINE

(75) Inventors: Takahiko Hirasawa; Yoshiaki Yoshioka, both of Kanagawa; Hatsuo Nagaishi, Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/634,008

(22) Filed: Aug. 7, 2000

(30) Foreign Application Priority Data

Aug. 6, 1999 (JP) .................................................. 11-223682

(51) Int. Cl.[7] ...................................................... F01L 1/34
(52) U.S. Cl. ..................... 123/90.15; 73/117.3; 73/118.2; 123/568.14; 123/568.21
(58) Field of Search .............................. 73/478, 480, 701, 73/104, 118.2, 117.3, 861; 123/568.14, 568.21, 403, 198 R

(56) References Cited

FOREIGN PATENT DOCUMENTS 61-258942   11/1986   (JP) .

*Primary Examiner*—Thomas Denion
*Assistant Examiner*—Jamie Corrigan
(74) *Attorney, Agent, or Firm*—Foley & Lardner

(57) ABSTRACT

In apparatus and method for calculating an internal cylinder intake-air quantity for a variable valve timing controlled engine, an air quantity flowing into the intake manifold from an output of an airflow meter is calculated, the airflow meter being installed in an upstream portion of an intake manifold with respect to an intake valve whose at lease closure timing is variably controlled, a cylinder volume of a corresponding cylinder of the engine is calculated, an income and outgo of an air quantity flowing into the intake manifold and a cylinder intake-air quantity flowing from the intake manifold into the corresponding cylinder is calculated to derive an air quantity in the intake manifold, the internal cylinder intake-air quantity is calculated on the basis of the air quantity of the intake manifold and the cylinder volume, and the calculated cylinder volume is corrected on the basis of at least valve closure timing of the intake valve. The calculated internal cylinder intake-air quantity is used to calculate a fuel injection quantity to be supplied to the corresponding cylinder through a fuel injector.

13 Claims, 6 Drawing Sheets

INTERNAL CYLINDER INTAKE-AIR QUANTITY CALCULATING APPARATUS AND METHOD FOR VARIABLE VALVE OPEN/CLOSURE TIMING CONTROLLED ENGINE

BACKGROUND OF THE INVENTION

1. Field of the Invention

The present invention relates generally to an internal cylinder intake-air quantity calculating apparatus and method for a variable valve open/closure timing controlled internal combustion engine in which open and closure timings of intake and exhaust valves are arbitrarily controlled. The present invention, more particularly, relates to the internal cylinder intake-air quantity calculating apparatus and method which accurately calculate a cylinder intake-air quantity sucked into each one of a plurality of engine cylinders (hereinafter referred to as an internal cylinder intake-air quantity) on the basis of an output of an airflow meter installed on a portion of an intake-air passage which is located at an upstream of an intake manifold.

2. Description of the Related Art

A Japanese Patent Application First Publication No. Showa 61-258942 published on Nov. 17, 1986 exemplifies a previously proposed fuel injection controlling apparatus in which a weight mean is carried out for the intake-air quantity measured by means of an airflow meter to calculate the internal cylinder intake-air quantity in a first-lag order relationship in order to cope with a stepwise change in an opening angle of an engine throttle valve in a normally available internal combustion engine in which an opening angle of the throttle valve is controlled to adjust the intake-air quantity supplied to the engine.

SUMMARY OF THE INVENTION

In addition, another fuel injection controlling apparatus has previously been proposed in which a quantity of air stream flowing into the intake manifold is calculated from an output of the airflow meter installed on the upstream portion of the intake manifold, a cylinder volume is calculated, an income-and-outgo calculation for the intake-air quantity between the air quantity flowing into the intake manifold and that flowing from the intake manifold into an inside of the cylinder is carried out to derive the intake-air quantity in the manifold portion, and the desired internal cylinder intake-air quantity is calculated on the basis of the air quantity in the manifold portion and the cylinder volume.

Consequently, a highly accurate calculation for the internal cylinder intake-air quantity can be achieved.

However, in the variable valve open/closure timing controlled internal combustion engine in which the open and/or closure timing of intake valve(s) and exhaust valve(s) are controlled, particularly, the closure timings of the intake valve(s) are controlled to adjust the internal cylinder intake-air quantity, a control over the intake valve closure timing causes a substantial change in the cylinder volume so that the internal cylinder intake-air quantity is accordingly varied in the stepwise manner. However, in the variable valve open/closure timing controlled internal combustion engine in which the open and/or closure timing of intake valve(s) are controlled, particularly, the closure timings of the intake valve(s) are controlled to adjust the intake-air quantity, a control over the intake valve closure timing(s) causes a substantial change in the cylinder volume so that the cylinder intake-air quantity is varied in the stepwise manner.

Following to this variation, the intake-air quantity passing through the throttle valve may often be varied. Hence, in the latter previously proposed fuel injection controlling apparatus, the cylinder intake-air quantity is calculated on an assumption that an actual cylinder volume is not abruptly varied (constant) and cannot respond to this abrupt change. Consequently, an automotive industry has demanded a more accurate calculation of the above-described internal cylinder intake-air quantity. The same problem occurs in a case where a valve overlap displacement between the intake and exhaust valves is varied to vary a remaining gas quantity (internal EGR).

It is, therefore, an object of the present invention to provide internal cylinder intake-air quantity calculating apparatus and method for the valve open/closure timing controlled internal combustion engine which can accurately calculate the internal cylinder intake-air quantity even when the abrupt change in the cylinder volume occurs or when the abrupt change in the valve overlap displacement occurs.

According to one aspect of the present invention, there is provided an apparatus for calculating an internal cylinder intake-air quantity for a variable valve timing controlled engine, comprising: an airflow meter installed in an upstream portion of an intake manifold with respect to an intake valve whose at lease closure timing is variably controlled; and a controller programmed to calculate an air quantity flowing into the intake manifold from an output of the airflow meter; to calculate a cylinder volume of a corresponding cylinder of the engine; to calculate an income and outgo of an air quantity flowing into the intake manifold and a cylinder intake-air quantity flowing from the intake manifold into the corresponding cylinder to derive an air quantity in the intake manifold; to calculate the internal cylinder intake-air quantity on the basis of the air quantity of the intake manifold and the cylinder volume; and to correct the calculated cylinder volume on the basis of at least valve closure timing of the intake valve.

According to another aspect of the present invention, there is provided a method for calculating an internal cylinder intake-air quantity for a variable valve timing controlled engine, comprising: calculating an air quantity flowing into the intake manifold from an output of an airflow meter, the airflow meter being installed in an upstream portion of an intake manifold with respect to an intake valve whose at lease closure timing is variably controlled; calculating a cylinder volume of a corresponding cylinder of the engine; calculating an income and outgo of an air quantity flowing into the intake manifold and a cylinder intake-air quantity flowing from the intake manifold into the corresponding cylinder to derive an air quantity in the intake manifold; calculating the internal cylinder intake-air quantity on the basis of the air quantity of the intake manifold and the cylinder volume; and correcting the calculated cylinder volume on the basis of at least valve closure timing of the intake valve.

This summary of the invention does not necessarily describe all necessary features so that the invention may also be a sub-combination of these described features.

DETAILED DESCRIPTION OF THE PREFERRED EMBODIMENT

Reference will hereinafter be made to the drawings in order to facilitate a better understanding of the present invention.

Figure 2:
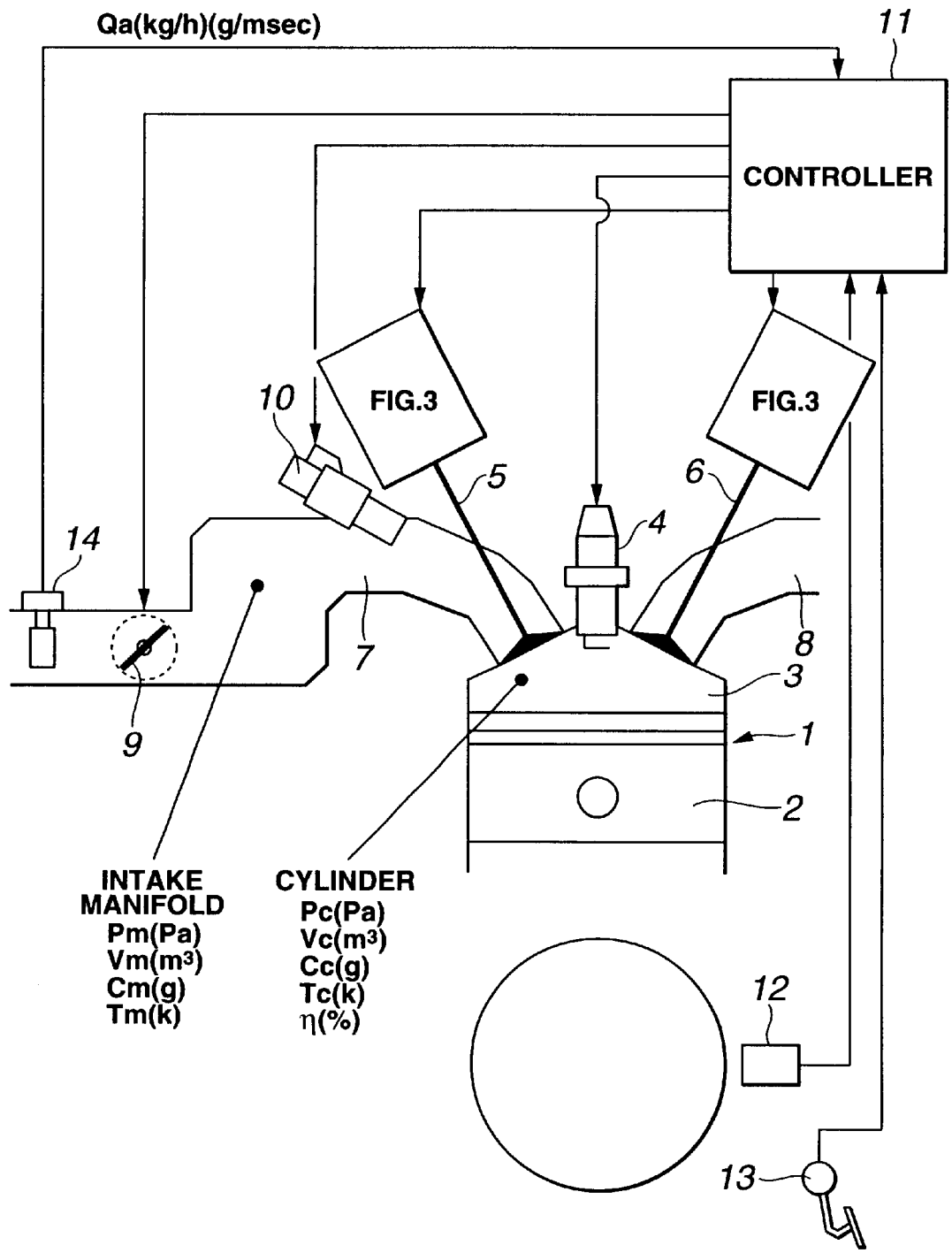
FIG. 2 is a rough configuration view of the internal cylinder intake-air quantity calculating apparatus applicable to the variable valve open/closure timing controlled engine.

FIG. 2 shows a system configuration of a variable valve open/closure timing control system mounted internal combustion engine to which a preferred embodiment of an internal cylinder intake-air quantity calculating apparatus according to the present invention is applicable.

A combustion chamber 3 defined by a piston 2 for each cylinder of an engine 1 is provided with electromagnetically driven intake valve 5 and exhaust valve 6. In FIG. 2, a reference numeral 7 denotes an intake-air passage and a reference numeral 8 denotes an exhaust passage.

Figure 3:
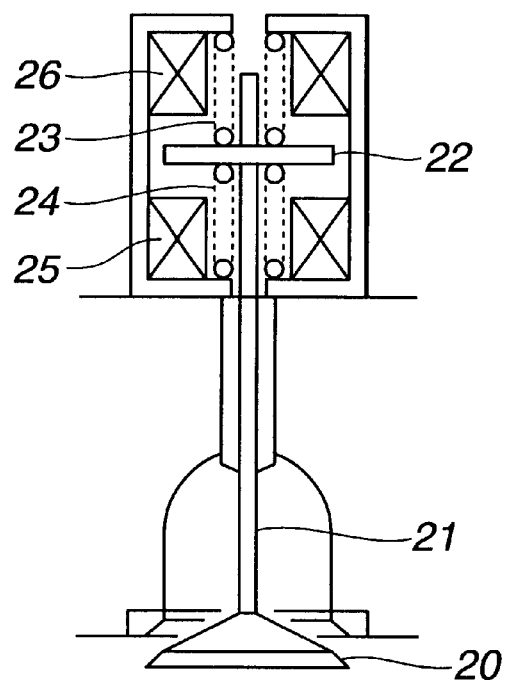
FIG. 3 is a fundamental structural view of an electromagnetic drive of each of intake and exhaust valves.

FIG. 3 shows a basic structure of the electromagnetically driven intake valve and exhaust valve 6.

In FIG. 3, a plate-like armature 22 is attached onto a valve axle 21 of a valve body 20. Armature 22 is biased at a so-called neutral position defined as shown in FIG. 3 by means of a pair of springs 25 and 26. Then, a valve opening purpose electromagnetic coil 25 is disposed on a lower side of armature 22 and a valve closure purpose electromagnetic coil 26 is disposed on an upper side of armature 22.

Hence, when the corresponding valve is to be opened, a power supply to upper valve closing purpose electromagnetic valve 26 is turned off and, thereafter, the power supply to lower valve opening purpose electromagnetic valve 25 is turned on so that armature 22 is attached onto the lower coil to lift valve body 20 to open the corresponding valve. On the contrary, when the valve is closed, the power supply to lower valve opening purpose electromagnetic coil 25 is turned off and, thereafter, the power supply to upper valve closing purpose electromagnetic coil 26 is turned on so that armature 22 is attracted onto upper electromagnetic coil 26 to seat valve body 20 on a seat portion thereof. Thus, the valve is closed. It is noted that although the electromagnetically driven valve open/closure timing control mechanism is used in the preferred embodiment, a hydraulically driven valve open/closure timing control mechanism may be used.

Referring back to FIG. 2, an electronically driven throttle valve 9 is installed at an upstream of the intake manifold in intake-air passage 7.

An electromagnetically driven fuel injector 10 is installed on an intake port of intake-air passage 7 for each cylinder.

A controller 11 controls operations of each intake valve 5, each exhaust valve 6, electronically driven throttle valve 9, each fuel injector 10, and each of spark plugs 4.

Controller 11 receives each signal outputted from a crank angle sensor 12 which outputs a crank angle signal in synchronization with an engine revolution and which is enabled to detect a crank angular position and to detect an engine speed Ne; from an accelerator depression depth sensor 13 to detect a depression depth APO of an accelerator pedal; and from a hot-wire airflow meter 14 to measure intake-air quantity (mass flow rate) Qa at the upstream portion of intake-air passage 7 than the throttle valve 9 with respect to intake valve 5.

In the engine 1 shown in FIG. 2, the open and closure timings of electromagnetically driven intake valve 5 and exhaust valve 6 are controlled in order to improve a fuel consumption due to a reduction of a pump loss. Particularly, closure timing IVC of intake valve 5 is variably controlled with the open timing IVO of intake valve 5 set at a timing in a vicinity to an upper top dead center (UTDC) so that the intake-air quantity is controlled to achieve a target air quantity corresponding to a demand torque based on acceleration depression depth APO and engine speed Ne and a substantial non-throttle driving is carried out. In this case, the opening angle of electronically driven throttle valve 9 is set to such a magnitude that a minute negative pressure about −50 mmHg is produced in the intake manifold under a predetermined driving condition (other than a high-load drive).

Then, open timing EVO and closure timing EVC of exhaust valve 6 are controlled at timings at which a most favorable thermal efficiency can be achieved.

It is noted that under a particular driving condition such that a combustion state becomes worsened due to the control over the intake-air quantity through closure timing IVC of intake valve 5 (for example, when engine 1 falls under a low load condition such as an engine idling or a cold start of the engine 1), it is possible to variably control opening angle TVO of electronically driven throttle valve 9 so as to control the intake-air quantity with closure timing IVC of intake valve 5 fixed at a stroke position placed in a vicinity to a lower top dead center (LTDC).

Both of fuel injection timing IT and final injection quantity Qsol of each fuel injector 10 are controlled on the basis of the engine driving condition. Fuel injection quantity Qsol is basically controlled to provide a desired air-fuel mixture ratio for an internal cylinder intake-air quantity (air mass in any one of the cylinders) Cc calculated as will be described later on the basis of the intake-air quantity (mass flow quantity) Qa measured by airflow meter 14.

An ignition timing through each spark plug 4 is controlled to provide an MBT (Minimum angle for Best Torque) or knocking limit on the basis of the engine driving condition.

Next, internal cylinder intake-air quantity Cc used to control such as the fuel injection quantity Qsol is calculated in accordance with operational flowcharts shown in FIGS. 4 through 8.

The detailed description on the calculation of internal cylinder intake-air quantity Cc will be made with reference to flowcharts in FIGS. 4 through 8.

As shown in FIG. 2, a unit of the intake-air quantity (air mass) measured by means of airflow meter 14 is Qa (Kg/h). However, intake-air quantity Qa is multiplied by 1/3600 to handle it as g/msec.

Then, suppose that a pressure at the intake manifold is Pm (Pa), a volume is Vm (m³; constant), an air mass is Cm (g), and a temperature is Tm (K).

In addition, suppose that the pressure within each cylinder is Pc (Pa), the volume is Vc (m³), the air mass is Cc (g), and the temperature is Tc (K), and a rate of a fresh air within the internal cylinder is η (%).

Furthermore, suppose that Pm=Pc and Tm=Tc (both pressure and temperature are not varied) between the intake manifold and the cylinder.

Figure 4:
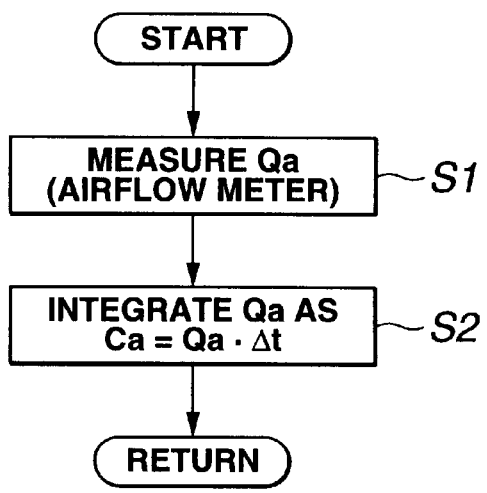
FIG. 4 is an example of an operational flowchart representing a calculation routine of an intake-air quantity flowing into an intake manifold shown in FIG. 2.

FIG. 4 shows the flowchart representing a calculation routine of an air quantity flowing into the intake manifold. The routine shown in FIG. 4 is executed for each predetermined period of time (for example, 1 millisecond). The routine shown in FIG. 4 corresponds to means for calculating an air quantity flowing in the intake manifold.

At a step S1 shown in FIG. 4, controller 11 measures intake-air quantity Qa (mass flow quantity; g/msec.) from the output of airflow meter 14.

At a step S2, controller 11 integrates intake-air quantity Qa to calculate an air quantity Ca (air mass, g) flowing into the manifold portion for each predetermined period of time Δt (Ca=Qa·Δt).

Figure 5:
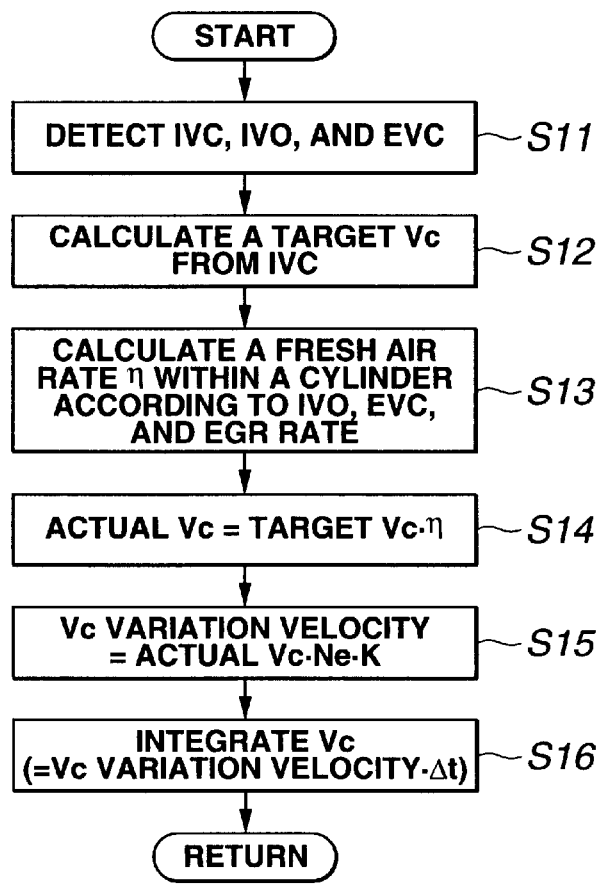
FIG. 5 is an example of an operational flowchart representing a calculation routine of a volume of a cylinder shown in FIG. 2.

FIG. 5 shows the flowchart representing a calculation routine of the cylinder volume.

The calculation routine shown in FIG. 5 is executed for each predetermined period of time Δt. This routine corresponds to means for calculating the cylinder volume including correcting means.

At a step S11, controller 11 detects closure timing IVC of intake valve 5, open timing IVO of intake valve 5, and closure timing EVC of exhaust valve 6.

It is noted that although these timing values may directly be detected from a lift sensor for each of intake and exhaust valves 5 and 6, command values on the valve open/closure timing control in controller 11 itself may be used.

At the next step S12, controller 11 calculates an instantaneous cylinder volume from the time IVC at which intake valve 5 is closed and sets the calculated cylinder volume as a target volume Vc (m³).

At the next step S13, controller 11 calculates a fresh air rate η (%) within the cylinder according to open valve timing IVO of intake valve 5 and closure timing EVC of exhaust valve 6, and an EGR (Exhaust Gas Recirculation) rate, if necessary.

That is to say, a valve overlap displacement between intake valve 5 and exhaust valve 6 is defined according to open timing IVO of intake valve 5 and closure timing IVO of exhaust valve 6. As the overlapped phase becomes larger, a remaining quantity of gas (an internal EGR rate) becomes larger. Hence, the rate η of the fresh air within the cylinder is derived on the basis of the valve overlap displacement.

In addition, in the variable valve open/closure timing controlled engine, a control over the valve overlap displacement permits a flexible control over the internal EGR rate. Although, in general, an EGR device (external EGR) is not installed, the EGR device may be installed. In this latter case, the EGR rate is further corrected to derive the final fresh air rate.

At the next step S14, controller 11 calculates an actual Vc (m³) corresponding to the target air quantity (=target Vc·η) by multiplying the fresh air rate c within the cylinder by the target Vc. At a step S15, controller 11 multiplies the actual Vc (m³) corresponding to the target air quantity by the engine speed Ne (rpm) to derive a variation velocity of Vc (volume flow quantity; m³/msec.)

Vc variation velocity=actual Vc·Ne·K - - - (1), wherein k denotes a constant to align the respective units into one unit and equals to 1/30·1/1000. It is noted that 1/30 means a conversion from Ne (rpm) to Ne (180 deg/sec.) and 1/1000 means the conversion of Vc (m³/sec) into m³/sec.

It is also noted that, in a case where such a control as to stop operations of parts of the whole cylinders is performed, the following equation of (2) is used in place of equation (1). Vc variation velocity=actual Vc·Ne·K·n/N - - - (2).

In equation (2), n/N denotes an operating ratio of the whole cylinders when the parts of the whole cylinders are stopped, N denotes the number of the whole cylinders, and n denotes the number of the parts of the whole cylinders which are operated. Hence, if, for example, in a four-cylinder engine, one cylinder is stopped, n/N equals to ¾.

It is noted that, in a case where the operation of a particular cylinder is stopped, the fuel supply to the particular cylinder is cut off with intake valve 5 and exhaust valve 6 of the particular cylinder held under respective complete closure conditions.

At the next step S16, controller 11 integrates the Vc variation velocity (volume flow quantity; m³/msec.) to calculate cylinder volume Vc (m³)=Vc variation velocity·Δt.

As described above, cylinder volume Vc is calculated. Particularly, steps 11 through 14 correspond to the correcting means based on the intake and exhaust valve open/closure timings.

Figure 6:
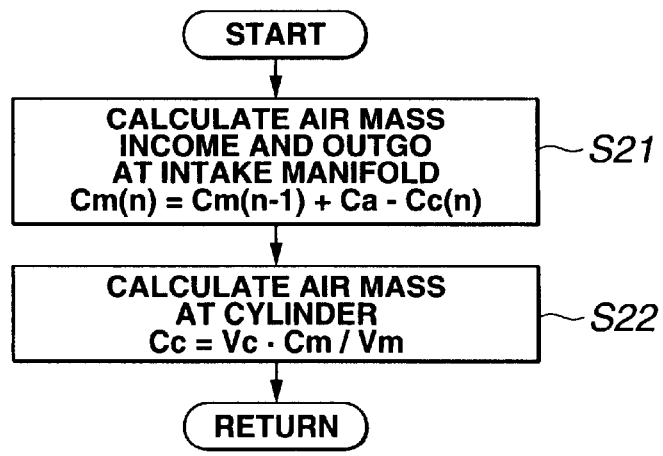
FIG. 6 is an example of an operational flowchart representing a continuous calculation routine of an intake manifold income and outgo calculation and an internal cylinder intake-air quantity.

FIG. 6 shows the flowchart representing a continuous calculation routine.

The calculation routines of an intake-air income and outgo at the intake manifold and of the internal cylinder intake-air quantity are executed as shown in FIG. 6 for each predetermined period of time Δt. This routine corresponds to the intake manifold intake-air income and outgo calculating means and to the internal cylinder intake-air calculating means.

Figure 7:
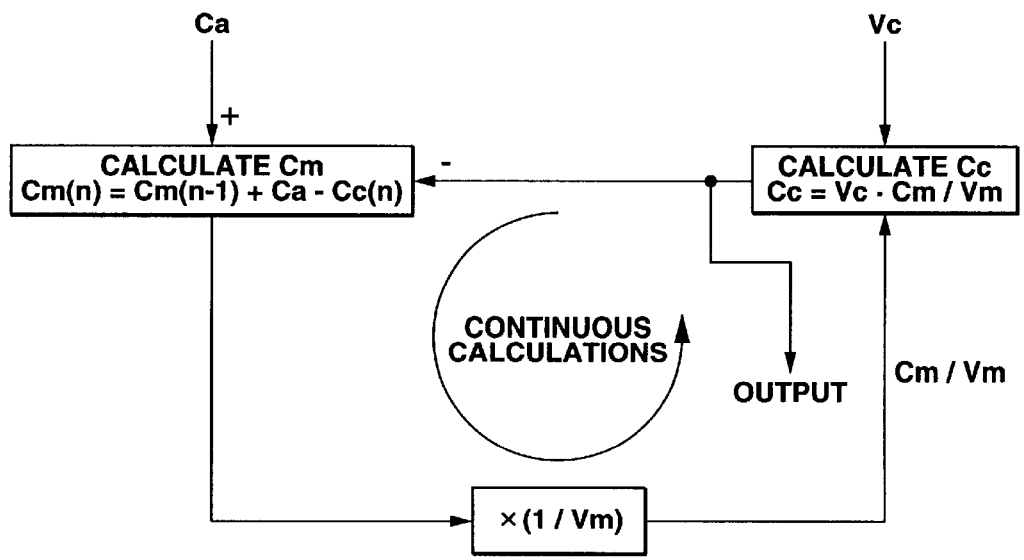
FIG. 7 is a schematic block diagram for explaining the continuous calculation shown in FIG. 6.

FIG. 7 shows a block diagram of the continuous calculating block.

At a step S21 in FIG. 6, to calculate the intake income and outgo quantity in the intake manifold (the income and outgo calculation of the air mass Ca (=Qa·Δt) flowing into the manifold portion derived at the routine shown in FIG. 4 is added to a previous value Cn(n−1) of the air mass at the intake manifold. Then, cylinder air mass Cc(n) which is the intake-air quantity into the corresponding cylinder is subtracted from the added result described above to calculate the air mass Cn(n)(g) in the intake manifold. That is to say, as shown in FIG. 6, Cn(n)=Cn(n−1)+Ca−Cc - - - (1)'

It is noted that, in equation (1)', Cc(n) denotes Cc of the air mass at the cylinder calculated at step S32 in the previous routine.

At step S22, to calculate the internal cylinder intake-air quantity (air mass Cc at the cylinder), controller 11 multiplies cylinder volume Vc derived at the routine shown in FIG. 5 with air mass Cm at the intake manifold and divides the multiplied result described above by manifold volume Vm (constant) to calculate an internal cylinder air mass Cc(g).

$$Cc=Vc \cdot Cm/Vm \qquad (1).$$

Equation (1) can be given as follows: according to an equation of gas state, $$P \cdot V = C \cdot V \cdot T, \quad C = Pc \cdot Vc/(R \cdot Tc) \qquad (2).$$

Suppose that $$Pc=Pm \text{ and } Tc=Tm. \ Cc=Pm \cdot Vc/(R \cdot Tm) \quad (3).$$

On the other hand, since, according to the gas state equation of $$P \cdot V = C \cdot R \cdot T, \ P/(R \cdot Tm) = Cm/Vm \quad (4)$$

If equation (4) is substituted into equation (3), $Cc=Vc \cdot [Pm/(R \cdot Tm)]=Vc \cdot [Cm/Vm]$ and equation (1) can be obtained.

As described above, executions of steps S21 and S22 are repeated, namely, the continuous calculation as shown in FIG. 7 which represents the internal cylinder intake-air quantity can be obtained and can be outputted.

It is noted that a processing order of steps S21 and S22 may be reversed.

Figure 8:
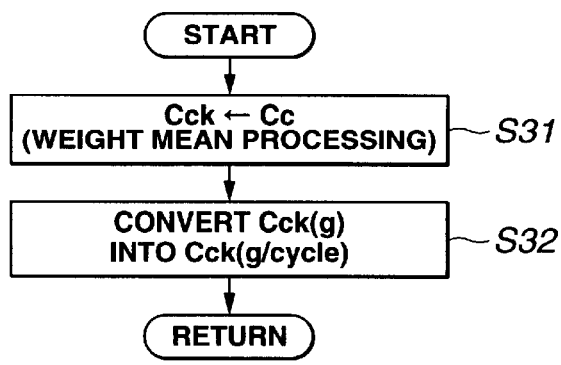
FIG. 8 is an example of an operational flowchart representing a post-process routine.

FIG. 8 shows the flowchart representing a post-process routine.

That is to say, at a step S31, controller 11 carries out a weight mean of internal cylinder air mass Cc (g) to calculate Cck(g).

$$Cck = Cck \times (1-M) + Cc \times M \quad (4)'$$

In equation (4)', M denotes a weight mean constant and 0<M<1.

At a step S32, in order to convert the air mass Cck(g) at the cylinder after the weight mean processing is carried out into that corresponding to one cycle of a four-stroke engine, controller 11 converts air mass Cck(g) into the air mass (g/cycle) at the cylinder for each cycle (two revolutions=720 degrees).

It is noted that if the weight mean processing is carried out only when a large intake pulsation occurs in such as a widely opened throttle valve (completely open), both of a control accuracy and a control response characteristic can be incompatible.

Figure 9:
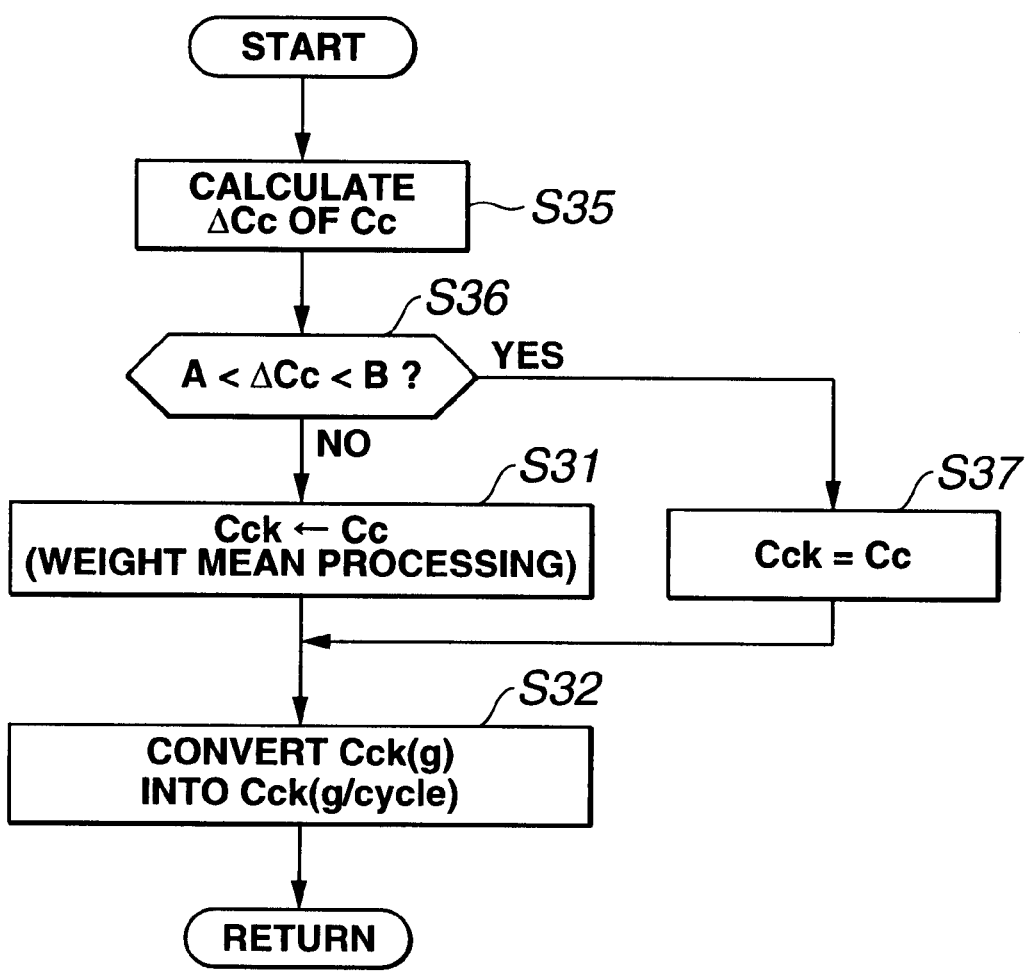
FIG. 9 is another example of an operational flowchart representing the post-process routine.

FIG. 9 shows the flowchart representing the calculation process on the post-process routine in the above described case.

That is to say, at a step S35, controller 11 calculates a variation rate $\Delta Cc$ of air mass Cc(g) at the cylinder.

At the next step S36, controller 11 compares variation $\Delta Cc$ with both of predetermined values A and B (A<B) to determine whether variation rate $\Delta Cc$ falls within a predetermined range. If A<$\Delta Cc$<B (Yes) at step S36, controller 11 determines that it is not necessary to perform the weight mean processing and the routine goes to a step S37.

At step S37, Cck (g)=Cc(g). Thereafter, the routine goes to a step S32. At step S32, controller 11 converts internal cylinder air mass Cck (g/cycle) for each cycle (two revolutions=720 deg.) in the same manner as the step S32 shown in FIG. 8.

As described above, when the internal cylinder intake-air quantity (internal cylinder air mass Cc and Cck) is calculated, viz., when the income-and-outgo calculations on air mass Cn are carried out while internal cylinder intake-air quantity (cylinder air mass) Cc is calculated on the basis of manifold air mass Cm and cylinder volume Vc, cylinder volume Vc is corrected on the basis of the open and closure timings of intake valve 5 and exhaust valve 6.

Particularly, the intake-air quantity is corrected according to the cylinder volume at the closure timing of the intake valve and according to the fresh air ratio within the cylinder which is in accordance with the valve overlap displacement.

Hence, the accurate calculation of the internal cylinder intake-air quantity can be achieved to cope with the substantial change in the cylinder volume.

Hence, the calculation accuracy of the internal cylinder intake-air quantity in the variable valve timing controlled engine can remarkably be improved.

In the fuel injection control, the control accuracy of the internal cylinder intake-air quantity in the variable valve timing controlled engine can remarkably be improved.

In the fuel injection control, the control accuracy of the air-fuel mixture ratio can thus be improved and both of exhaust performance and driving performance can consequently be improved.

In addition, since neither a pressure responsive sensor nor a temperature sensor is installed in the intake-air quantity calculating apparatus, no increase in a manufacturing cost will be resulted.

Figure 1A:
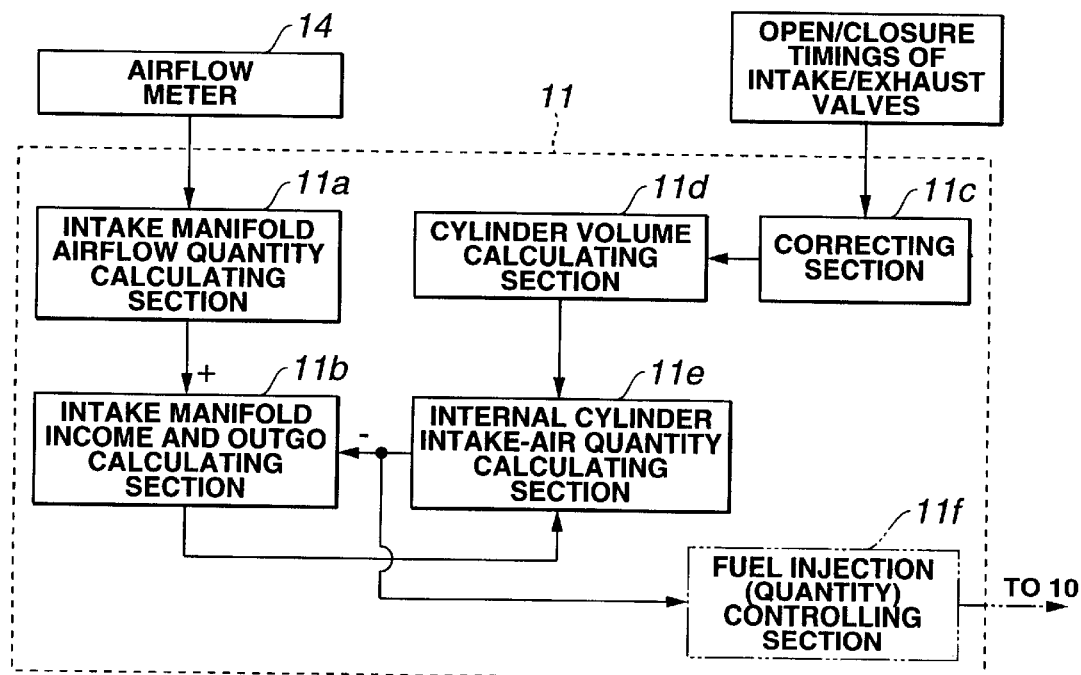
FIG. 1A is a schematic functional block diagram of a controller in an internal cylinder intake-air quantity calculating apparatus for a variable valve open/closure timing controlled engine.

It is noted that FIG. 1A shows a functional block diagram of the internal cylinder intake-air quantity calculating apparatus in the preferred embodiment according to the present invention.

In FIG. 1A, controller 11 shown in FIG. 2 includes: an intake manifold airflow quantity calculating section 11a that calculates the air quantity flowing into the intake manifold from the output of airflow meter 14; a cylinder volume calculating section 11d that calculates the volume of the corresponding cylinder; an intake manifold income and outgo calculating section 11b that calculates the air quantity flowing into the intake manifold and the cylinder intake-air quantity flowing from the intake manifold into the corresponding cylinder to derive the air quantity in the intake manifold; an internal cylinder intake-air quantity calculating section 11e that calculates the internal cylinder intake-air quantity on the basis of the air quantity of the intake manifold and the cylinder volume; and a correcting section 11c that corrects the cylinder volume on the basis of the valve open/closure timings of the intake and exhaust valves 5 and 6. Controller 11 further includes fuel injection (quantity) controlling section 11f that calculates the fuel injection quantity injected through fuel injector 10 on the basis of the internal cylinder intake-air quantity derived at the internal cylinder intake-air calculating section 11e.

Figure 1B:
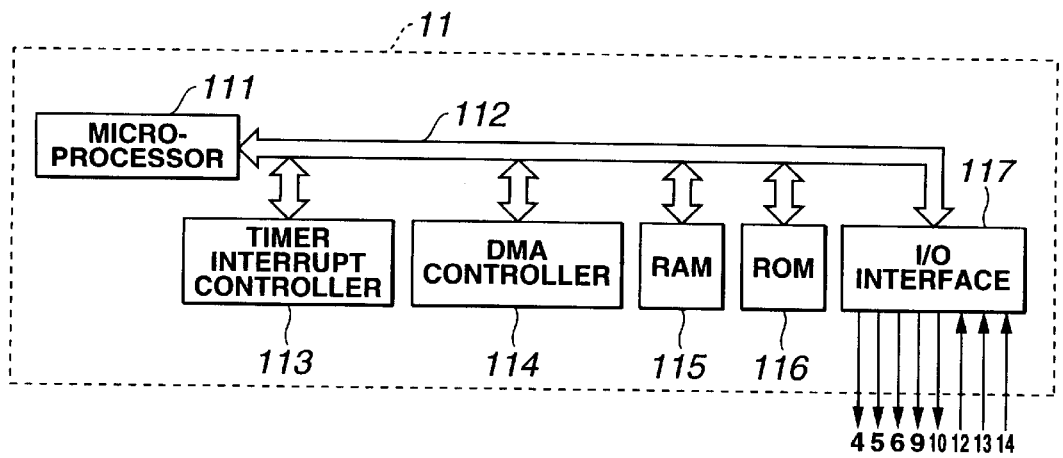
FIG. 1B is a schematic circuit block diagram of the controller shown in FIG. 1A.

It is also noted that FIG. 1B shows an internal circuit structure of the controller 11 shown in FIGS. 1A and 2, controller 11 generally includes a microprocessor 111, a common bus 112, a timer interrupt controller 113, a DMA (Direct Memory Access) controller 114, a RAM (Random Access Memory) 115, a ROM (Read Only Memory) 116, and an I/O interface circuit having an Input port and Output port.

It is further noted that, as viewed from FIG. 2, the numbers of intake valve 5 and exhaust valve 6 are single per cylinder but may be two or more per cylinder and the cylinder is single but the same calculation on the internal cylinder intake-air quantity is applicable to each of all cylinders of engine 1.

The entire contents of a Japanese Patent Application No. Heisei 11-223682 (filed in Japan on Aug. 6, 1999) are herein incorporated by reference. Although the invention has been described above by reference to certain embodiment of the invention, the invention is not limited to the embodiments described above. Modifications and variations of the embodiments described above will occur to those skilled in the art in the light of the above teachings. The scope of the invention is defined with reference to the following claims.

What is claimed is:

1. An apparatus for calculating an internal cylinder intake-air quantity for a variable valve timing controlled engine, comprising:

an airflow meter installed in an upstream portion of an intake manifold with respect to an intake valve whose at least closure timing is variably controlled; and a controller programmed to calculate an air quantity flowing into the intake manifold from an output of the airflow meter; to calculate a cylinder volume of a corresponding cylinder of the engine; to calculate an income and outgo of an air quantity flowing into the intake manifold and a cylinder intake-air quantity flowing from the intake manifold into the corresponding cylinder to derive an air quantity in the intake manifold; to calculate the internal cylinder intake-air quantity on the basis of the air quantity of the intake manifold and the cylinder volume; and to correct the calculated cylinder volume on the basis of at least valve closure timing of the intake valve.

2. An apparatus for calculating an internal cylinder intake-air quantity for a variable valve timing controlled engine as claimed in claim 1, wherein the controller is programmed to correct the cylinder volume on the basis of the corresponding cylinder volume at the timing at which the intake valve is closed.

3. An apparatus for calculating an internal cylinder intake-air quantity for a variable valve timing controlled engine as claimed in claim 2, wherein the controller is programmed to correct the cylinder volume on the basis of a rate of fresh air within the corresponding cylinder in accordance with open and closure timings of the intake valve and an exhaust valve.

4. An apparatus for calculating an internal cylinder intake-air quantity for a variable valve timing controlled engine as claimed in claim 1, wherein the controller is programmed to calculate the air quantity Ca flowing into the intake manifold as follows: Ca=Qa+$\Delta$t, wherein Qa denotes the output of the airflow meter in g/msec. and $\Delta$t denotes a predetermined period of time.

5. An apparatus for calculating an internal cylinder intake-air quantity for a variable valve timing controlled engine as claimed in claim 4, wherein the controller is programmed to detect the valve closure timing IVC of the intake valve, a valve open timing IVO of the intake valve, and a valve closure timing EVC of the exhaust valve; to calculate the cylinder volume at the valve closure timing IVC of the intake valve according to the timing IVC of the intake valve to derive a target cylinder volume target Vc; to calculate the rate $\eta$ of fresh air in the corresponding cylinder according to the valve open timing of the intake valve and the valve closure timing of the exhaust valve; to calculate an actual cylinder volume actual Vc corresponding to a target air quantity as follows: actual Vc=target Vc·$\eta$; to calculate a cylinder volume variation velocity Vc variation velocity as follows: Vc variation velocity=actual Vc·Ne·K, wherein Ne denotes an engine speed and K denotes a constant; and to calculate the cylinder volume Vc in $m^3$ Vc=Vc variation velocity·$\Delta$t.

6. An apparatus for calculating an internal cylinder intake-air quantity for a variable valve timing controlled engine as claimed in claim 5, wherein the controller is programmed to calculate the income and outgo of the air quantity flowing into the intake manifold and the cylinder intake-air quantity as follows: Cm(n)=Cm(n−1)+Ca−Cc(n), wherein Cc (n) denotes an internal cylinder air mass Cc at a present time and Cc=Vc·Cm/Vm, wherein Vc denotes the cylinder volume (Vc=Vc variation velocity·$\Delta$t), Cn(n−1) denotes an air mass in the intake manifold Cm at a previous time, and Vm denotes a volume of the intake manifold.

7. An apparatus for calculating an internal cylinder intake-air quantity for a variable valve timing controlled engine as claimed in claim 6, wherein the controller is programmed to calculate the internal cylinder intake-air quantity using a weight mean calculation as follows: Cck=Cck·(1−M)+Cc·M, wherein M denotes a weight mean constant and 0<M<1 and to calculate the internal cylinder air mass per cycle as follows: Cck (g/cycle)=Cck/(120/Ne).

8. An apparatus for calculating an internal cylinder intake-air quantity for a variable valve timing controlled engine as claimed in claim 5, wherein the engine is controlled with a fuel supply to a particular cylinder cut off and the corresponding intake and exhaust valves held to be closed completely and wherein the controller is programmed to calculate the cylinder volume variation velocity Vc variation velocity as follows: Vc variation velocity=actual Vc·Ne·K·n/N, wherein n/N denotes an operating ratio of the whole cylinders of the engine, N denotes the number of cylinders of the engine, and n denotes the number of operating cylinders.

9. An apparatus for calculating an internal cylinder intake-air quantity for a variable valve timing controlled engine as claimed in claim 4, wherein the controller is programmed to calculate an EGR rate and wherein the controller is programmed to calculate the rate $\eta$ of fresh air within the cylinder according to the EGR rate in addition to the open timing IVO of the intake valve and the closure timing EVC of the exhaust valve.

10. An apparatus for calculating an internal cylinder intake-air quantity for a variable valve timing controlled engine as claimed in claim 7, wherein the controller is programmed to calculate a variation rate $\Delta$Cc of the internal cylinder air mass Cc and to calculate the internal cylinder intake-air quantity Cck using the weight mean calculation when the variation rate $\Delta$Cc falls out of a predetermined range.

11. An apparatus for calculating an internal cylinder intake-air quantity for a variable valve timing controlled engine as claimed in claim 1, wherein the controller is programmed to control a fuel injection quantity of the engine through a fuel injector on the basis of the calculated internal cylinder intake-air quantity.

12. An apparatus for calculating an internal cylinder intake-air quantity for a variable valve timing controlled engine, comprising:

an airflow meter installed in an upstream portion of an intake manifold with respect to an intake valve whose at lease closure timing is variably controlled;

intake manifold air quantity calculating means for calculating an air quantity flowing into the intake manifold from an output of the airflow meter;

cylinder volume calculating means for calculating a cylinder volume of a corresponding cylinder of the engine;

air quantity income and outgo calculating means for calculating an income and outgo of an air quantity flowing into the intake manifold and a cylinder intake-air quantity flowing from the intake manifold into the corresponding cylinder to derive an air quantity in the intake manifold;

an internal cylinder intake-air quantity calculating means for calculating the internal cylinder intake-air quantity on the basis of the air quantity of the intake manifold and the cylinder volume; and correcting means for correcting the calculated cylinder volume on the basis of at least valve closure timing of the intake valve.

13. A method for calculating an internal cylinder intake-air quantity for a variable valve timing controlled engine, comprising:

calculating an air quantity flowing into the intake manifold from an output of an airflow meter, the airflow meter being installed in an upstream portion of an intake manifold with respect to an intake valve whose at lease closure timing is variably controlled;

calculating a cylinder volume of a corresponding cylinder of the engine;

calculating an income and outgo of an air quantity flowing into the intake manifold and a cylinder intake-air quantity flowing from the intake manifold into the corresponding cylinder to derive an air quantity in the intake manifold;

calculating the internal cylinder intake-air quantity on the basis of the air quantity of the intake manifold and the cylinder volume; and correcting the calculated cylinder volume on the basis of at least valve closure timing of the intake valve.

* * * * *